Figure 1:
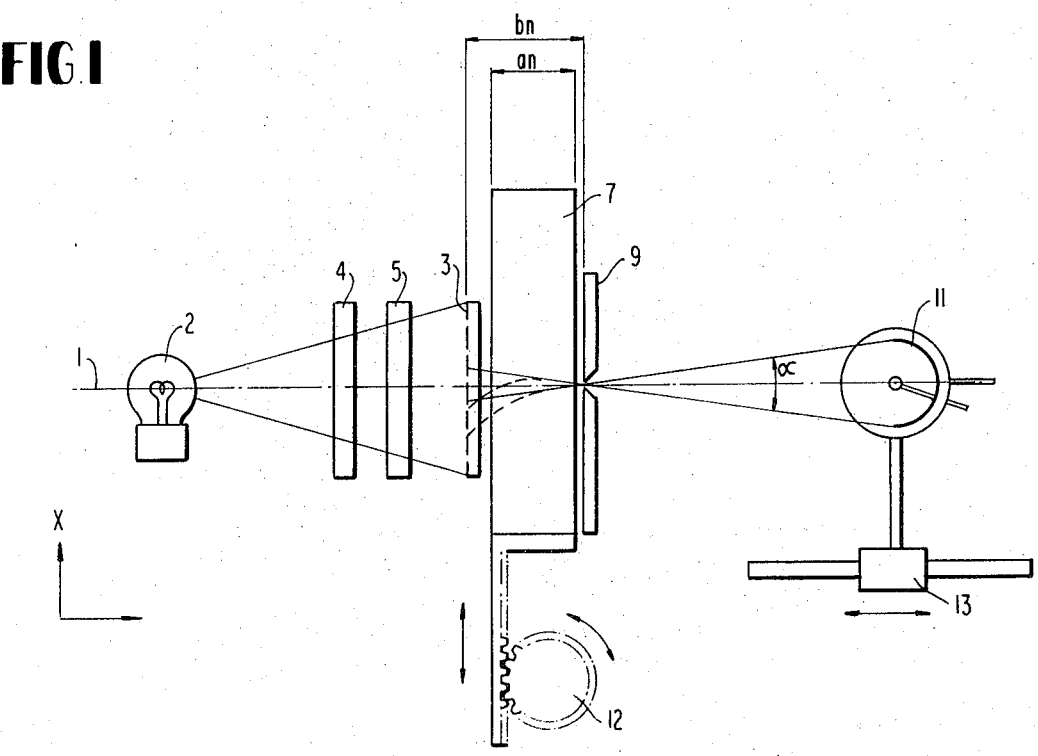

United States Patent [19]

Pettersson

[11] 3,841,762

[45] Oct. 15, 1974

[54] OPTICAL ARRANGEMENT FOR RECORDING A VARIABLE LIGHT ABSORBANCE IN OBJECTS ALSO HAVING A VARIABLE OPTICAL THICKNESS

[75] Inventor: Jarl Sune Pettersson, Goteborg, Sweden

[73] Assignee: Ingenjorsfirman Gradient, Birgit and Harry Rilbe, Goteborg, Sweden

[22] Filed: Apr. 25, 1973

[21] Appl. No.: 354,399

[30] Foreign Application Priority Data

Apr. 26, 1972 Sweden.............................. 5469/72

[52] U.S. Cl............................... 356/203, 356/128
[51] Int. Cl. ............................................ G01n 21/06
[58] Field of Search ....... 356/96, 97, 105, 201, 202, 356/203, 128

[56] References Cited
UNITED STATES PATENTS

| | | | |
|---|---|---|---|
| 1,939,088 | 12/1933 | Styer.................................. | 356/201 |
| 1,967,583 | 7/1934 | McFarlane et al.................. | 356/205 |
| 3,428,814 | 2/1969 | Doonan............................. | 356/205 |
| 3,432,414 | 3/1969 | Rand................................ | 204/299 R |

OTHER PUBLICATIONS

General Catalog 86, Klinger Scientific Apparatus Corp., Jamaica, N.Y., 11/71, pp. 9, 33–35.

Disc Electrophoresis, Canal Industrial Corp., Bethesda, MD., 10/64.

Primary Examiner—Ronald L. Wibert
Assistant Examiner—Conrad Clark

[57] ABSTRACT

In order to obtain correct readings of the optical absorbance of a sample placed between a light source and optical sensing means which sample also has varying optical thickness in a direction transverse to that light path, the light path is confined to a narrow slit and measurements are made with relative movement between the light path and sample in a direction normal to the length of the slit.

15 Claims, 9 Drawing Figures

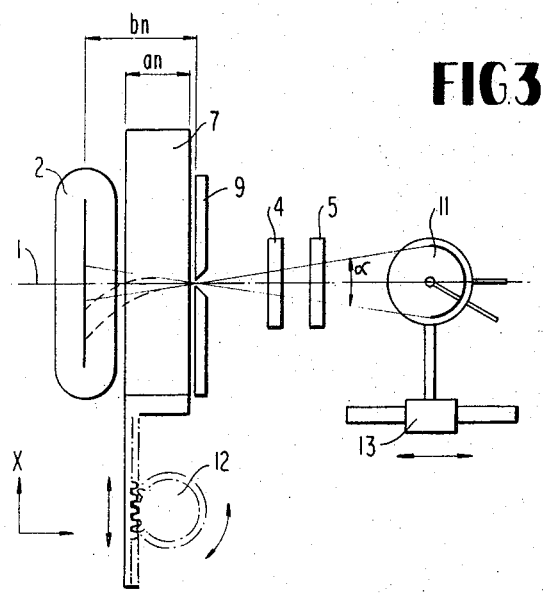
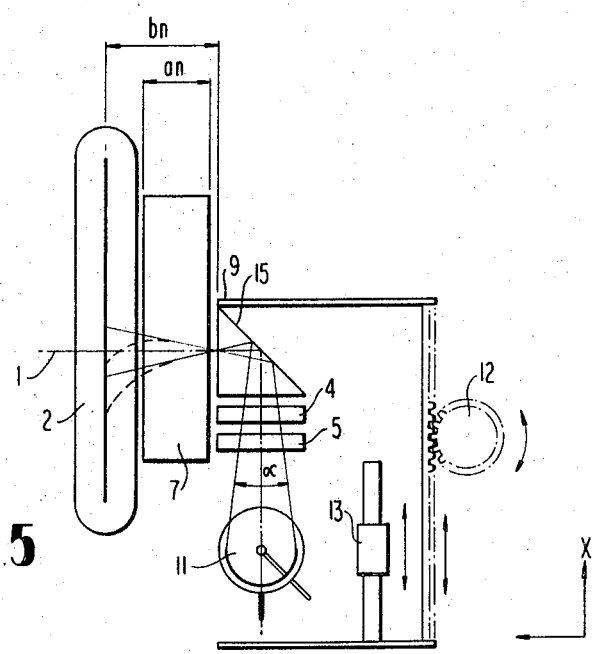
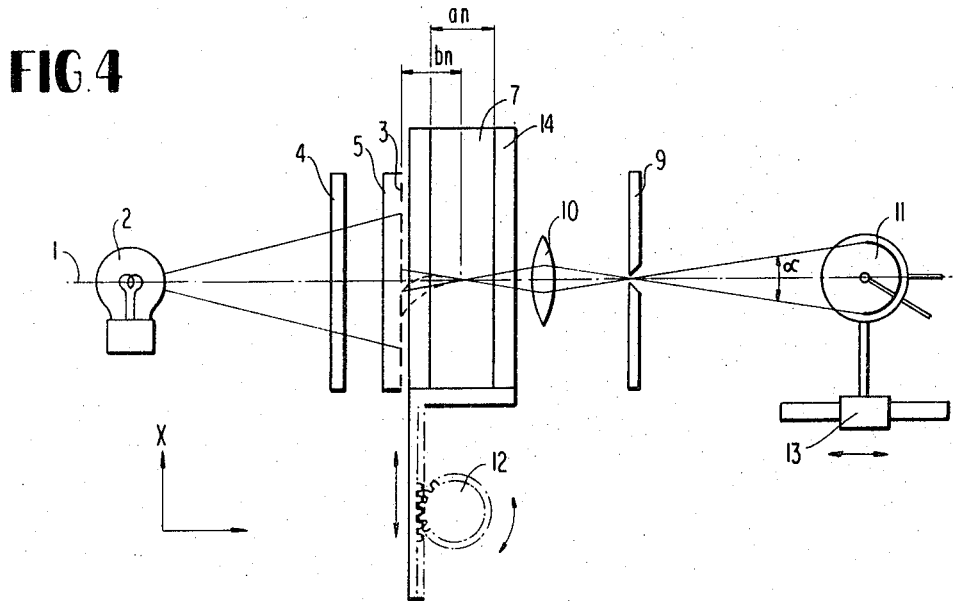

OPTICAL ARRANGEMENT FOR RECORDING A VARIABLE LIGHT ABSORBANCE IN OBJECTS ALSO HAVING A VARIABLE OPTICAL THICKNESS

Absorptiometers and spectrophotometers are designed for plano-parallel cells containing optically homogeneous solutions. Such objects have a constant optical thickness, and light passing through them do not suffer any angular deflection. Objects in which either the refractive index, or the thickness, or both vary from point to point have a variable optical thickness, and such objects are known to deflect light in the direction of an increasing optical thickness. If such an object is placed in the cell position of a spectrophotometer, it is difficult to known what happens to the light passing through the object. The deflected light may be obstructed by a stop in the optical system, or it may come outside the active area of the light-sensitive device.

In connection with electrophoresis and centrifugation there is now a growing practice of putting the separation cells or other objects, together with a fixed slit and a cell elevator, into spectrophotometers in order to make use of their optical systems for absorptiometric scanning of the objects in which the separation has take place. In this way one hopes to get concentration analyses in the form of electrophoretic or centrifugal absorption spectra in a much more convenient way than by taking fractions and measuring them in the spectrophotometer. However, items that have been subjected to electrophoresis or centrifugation have a variable optical thickness, and consequently light passing through them will undergo two optical effects, light absorption and light deflection in the gradient of optical thickness. If so deflected light does not reach the light-sensitive device, or only partly so, the response of the latter will depend on both light absorption and light deflection in unknown proportions. The absorptiometric analysis will thus be afflicted with systematic errors which can be more or less serious depending on the properties of the course of the optical thickness in the object under measurement. In some cases, the errors are unimportant, whereas in other cases they may be fatal.

The inventor noticed the presence of these errors in connection with absorptiometric scanning in ultraviolet light of cells used for isoelectric focusing. Such cells, which are planoparallel, are stabilized against convection with the aid of a strong density gradient, which is accompanied by a strong refractive index gradient. In addition, the various ampholytes present in the liquid are focused into narrow bands by the action of the current and the pH gradient created by the current. These bands or zones give rise to strong local refractive index gradients which are superimposed on that caused by the density gradient. The ampholytes brought to focus in narrow bands are of two kinds: the proteins under analysis, giving rise to both absorbance and refractive index gradients, and the auxiliary ampholytes called carrier ampholytes, giving rise only to refractive index gradients, since they are, as a matter of principle, transparent to the radiation used for absorptiometric scanning. There is evidently a great risk that the complex variation of the refractive index from top to bottom of such a cell and the accompanying light deflection may cause a failure for the transmitted light to reach the light-sensitive device. Specifically, light through focused zones of carrier ampholytes may be deflected outside the active area of the light-sensitive device, which causes these transparent chemicals to show up as false absorption peaks. It is quite evident that completely wrong absorption spectra may be obtained in this way. As a matter of fact, they are not absorption spectra, but spectra displaying effects of an unknown combination of light absorption and deflection, which are completely useless.

Isoelectric focusing, as well as other form of zone electrophoresis, may also be carried out in gel slabs, nowadays in general synthetic polyacrylamide gels. The protein zones are then stained with certain dyes sticking to proteins, and excess dye is washed away. The protein zones are then visible to the eye and absorptiometric scanning is, as a matter of principle, possible with visible light. However, these gel slabs have also a varying optical thickness, for two reasons. First, there are refractive index gradients due to the variable concentrations of focused ampholytes. Second, the gel slabs have a varying geometrical thickness since one gel surface is open to the air and thus can swell or shrink due to changes in water content. It is empirically known that the thickness variations may be quite considerable; the gels very often have a wavy appearance well visible to the naked eye. In summary, even separation items in the form of gel slabs have strong gradients in optical thickness and will thus display strong deflection of light passing through them. Consequently, absorptiometric scanning in an ordinary spectrophotometer is liable to give serious systematic errors due to light deflection.

A light absorptiometer for objects with a variable optical thickness must be designed so as to make it impossible for the light-sensitive device to lose any light due to angular deflection. The present invention serves to realize an optical system securing a correct absorptiometric analysis even in the presence of strong light deflection in the object due to a varying refractive index and/or a varying geometrical thickness.

The absorbance may vary in more than one direction in the object to be measured, but a coordinate axis $x$ has to be chosen along which the absorbance is to be recorded. In general, this coordinate will be the same as that along which the electrical or centrifugal force was active during separation. In cells with liquid contents, the light deflection occurs in the same direction, but in gel slabs light may also be deflected in other directions.

The arrangement according to the invention comprises, like already described arrangements for this purpose, a primary and possibly also a secondary light source, a holder for the object to be measured, means for monochromatizing the radiation from said light source, a light-sensitive device receiving from said light source radiation that has passed through said object and said monochromatizing means, a slit which is narrow in the $x$ direction and which in the object limits the extension in said direction of that light pencil which hits the active area of the light-sensitive device, and means for a relative motion in the $x$ direction between said object and said slit. The invention is characterized by a light source having a constant radiation intensity in the $x$ direction over a length subtending an angle from the slit which is greater than the angle subtended by the active area of the light-sensitive device from said slit. Preferably, the light source has a constant intensity perpendicularly to the $x$ direction also. An optical system with these characteristics operates as will be explained below in the case of objects with gradients in both light absorbance and optical thickness.

Let us first assume that the light deflection occurs in the $x$ direction, which will be supposed to be vertical. If the active area in the light-sensitive device subtends the angle $\alpha$ in the vertical section, and if the optical distance between the vertically extended light source and the slit is $b$ length units, then the light-sensitive device will receive light from a portion of said light source having the vertical extension $2b \tan \alpha/2$, or approximately $b\alpha$, length units. If that portion of the object which is passed by this pencil has a constant optical thickness, the portion of the light source that emits the light reaching the active area of the light-sensitive device lies centrally around the straight line from the centre of the active area in the light-sensitive device through the slit. On the other hand, if the portion of the object in question has a variable optical thickness, with its gradient directed downwards, a downwards displaced portion of the light source of the same length $b\alpha$ will deliver that light which reaches the active area of the light-sensitive device. Since this portion of the light source has the same intensity, the same light flux will reach the active area of the light-sensitive device irrespective of whether the object under measurement deflects the light or not. The light-sensitive device, then, cannot respond to a gradient in optical thickness, but only to light absorption. On scanning, one thus obtains a correct absorption spectrum.

Let us then assume that the light deflection in the object occurs perpendicular to the $x$ direction. The portion of the light source that delivers light to the active area of the light-sensitive device will then be displaced sideways, but its horizontal extension will be unaltered. Again, since the intensity of the light source is constant in this direction also, there will be no change in the flux of light that reaches the active area of the light-sensitive device. A correct absorption spectrum will thus be obtained in this case also.

The extension within the object in the $x$ direction of that light pencil which reaches the active area of the light-sensitive device is determined essentially by two factors, the angle $\alpha$ subtended by said active area in the $x$ direction when viewed from the slit, and the optical distance from said slit to that portion of the object which is farthest from the slit. Said extension of the active light pencil has to be varied in accordance with the breadths of the absorbing zones in the object. The narrower these zones, the narrower the analyzing light pencil has to be. The slit is preferably placed as close to the object as possible on the side facing on the light-sensitive device. The extension of the analyzing light pencil can then be varied only by varying the angle $\alpha$ defined above.

A variation of the angle $\alpha$ is preferably obtained by introducing means for altering the distance between the slit and the light-sensitive device. This is better than having an adjustable stop between slit and light-sensitive device in fixed positions because it is preferable always to use the whole active area of the light-sensitive device. With very narrow absorbing zones in the object, the light-sensitive device should be placed far from the slit, which gives a small angle $\alpha$ and a relatively low light intensity. With broader zones in the object, the light-sensitive device can be shifted closer to the slit, which gives a larger angle $\alpha$ and an increased light intensity.

It may happen that objects to be recorded absorptiometrically have such a geometry that makes it impossible to place a slit sufficiently close to it. In such cases it is advantageous to introduce a lens or other focusing optical element into the optical system in such a way as to project an optical image of the slit on the middle plane of the object. Such an arrangement works optically as if the slit itself were situated in the middle plane of the object. The maximum extension in the $x$ direction of the active light pencil within the object then becomes limited to $a \tan \alpha/2$, or approximately $a\alpha/2$, length units, where $a$ is the optical distance across the object in the direction of the radiation.

The invention also comprises means for a relative motion in the $x$ direction between the object and the slit. It is self-evident that such a relative motion can be effected by having a fixed salt in conjunction with means for shifting the object in the $x$ direction past said slit, other optical elements also being stationary, or by having the object in a fixed position while the slit is shifted in the $x$ direction along the object, other optical elements preferably following the slit in parallel movements. The former arrangement is preferred because of its greater simplicity. It is possible, however, to design optical systems according to the invention in which only the slit, or the slit together with the light-sensitive device, are moved along the object in the $x$ direction if certain precautions are taken. Thus, if the light source is stationary in relation to the slit, it must have a constant intensity along the whole object in the $x$ direction, which is otherwise not necessary. If the light-sensitive device is stationary while the slit is movable, one has to be cautious about parallactic errors in the localization of absorbing zones in the object. If the slit is focused on to the middle plane of the object, the focusing element has to accompany the slit in its movement.

The invention requires a light source with a certain extension of constant intensity at least in the $x$ direction. The length along which it must have a constant intensity (its isointense length) depends on the means for effecting the relative motion between object and slit. If there is a relative motion between slit and light source, the isointense part of the latter must be longer than the object in the $x$ direction. In the preferred arrangement, on the other hand, with light source, slit, and light-sensitive device stationary in relation to each other, the isointense part of the light source may be considerably smaller. Its minimum length must, however, subtend an angle when viewed from the slit certainly greater than the angle subtended by the active area of the light-sensitive device viewed from the same slit. If the light source can be placed rather close to the slit, on the other side of the object, it suffices with an isointense length of only 5 — 10 mm. A primary light source in the form of an incandescent lamp with a sufficiently long, straight filament, or in the form of a gas discharge lamp with a sufficiently long arc, is then adequate even if these lamps have clear glass or quartz bulbs. The use of the radiating body in a lamp without an intervening secondary light source has the advantage of giving an abundant light intensity and the disadvantage of exposing the object to undue heating and, especially with ultraviolet light, photochemical effects.

Instead of using a primary light source directly, it is very advantageous in this invention to use a secondary light source in the form of a matte surface evenly illuminated by a primary light source, this surface reemitting light in all directions. The monochromatizing means are then preferentially placed between the primary and secondary light sources. It is very easy to realize a uniform intensity in a matte screen over large areas extending both in the $x$ direction and perpendicularly thereto, whereas it may be rather difficult to supply primary light sources with uniform intensity in two dimensions. An optical system with a matte surface as a secondary light source is therefore a much preferred arrangement in the present invention. In cases where the object is a stained gel slab capable of deflecting light in all directions, there is hardly any other possibility of obtaining correct absorption records. The matte surface, however, is also very useful for objects in which all light deflection occurs in the $x$ direction. The active area of the light-sensitive device has an appreciable extension both in the $x$ direction and perpendicularly thereto, and this whole area should preferably be used. This can only be done by using a light source extended in two dimensions.

The mat surface may belong to a separate optical element in the form of a matte screen. It may also be one wall of another optical element, for instance a light filter, a plate supporting a gel slab, or the wall, facing on the light source, of a cuvette containing a liquid column to be analyzed. Finally, it may be the matte bulb of a lamp. Such a lamp is a combined primary and secondary light source.

Figure 6:
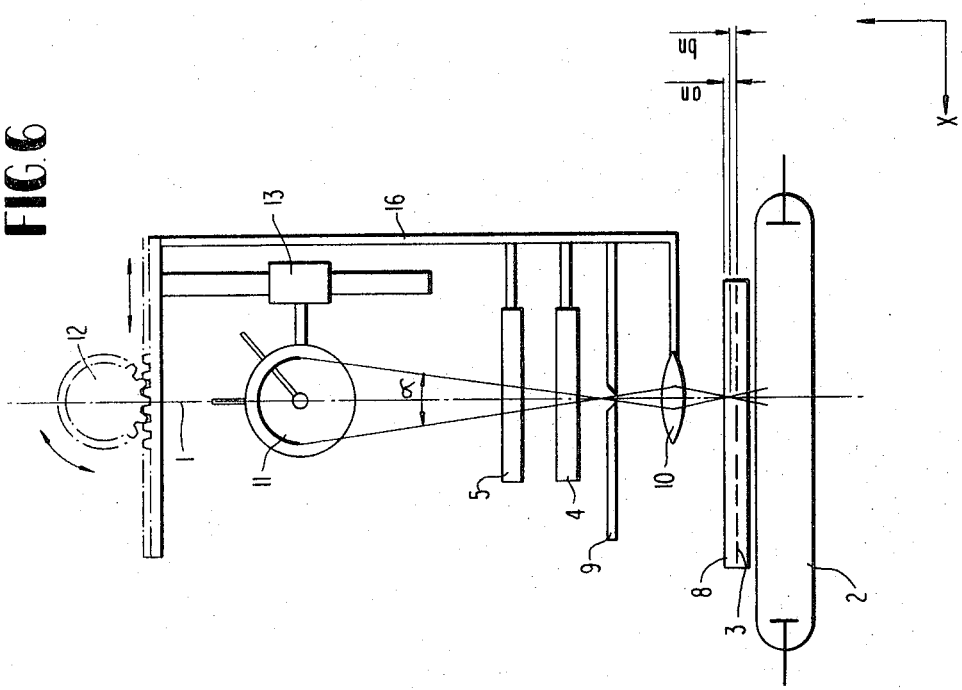

In the drawings, FIG. 1 is a diagramatic representation of a preferred form of apparatus in accordance with the invention, in which the sample is moved relative to a narrow light path; FIGS. 2 – 4 and 7 are diagrammatic representations of modified forms of the invention in which the sample is movable relative to the light path; FIGS. 5 and 6 are diagrammatic representations of two modifications in which the sample is fixed and the light path is movable with respect thereto; FIG. 8a illustrates an absorptiometric curve by conventional equipment, and; FIG. 8b illustrates a curve made by a spectrophotometer of the present invention in which refractive index gradients have been eliminated.

In the accompanying figures, presented merely as examples and not in any restrictive sense, (1) denotes the optic axis, (2) a primary light source, (3) a secondary light source in the form of a matte surface of a transparent material which on illumination reemits light in all directions, (4) and (5) light filters, (6) a monochromator, (7) the object to be recorded absorptiometrically in the $x$ direction in the form of a cell containing a liquid column, (8) the object to be recorded in the form of a stained, horizontal gel slab, (9) a slit which is narrow in the $x$ direction, (10) a lens throwing an optical image of the slit on the middle plane of the object, (11) a light-sensitive device, for instance a phototube, (12) a device for moving an element crosswise to the optical axis and crosswise to the slit, and (13) a device for shifting the light-sensitive device along the optic axis. The angle subtended by the active area in the light-sensitive device when viewed from the slit is denoted by $\alpha$, the thickness of the object along the optic axis, divided by the refractive index ($n$), by $a$, and the optical distance between slit and light source by $b$. The divergent light pencil which hits the active area of the light-sensitive device is drawn with solid straight lines in the case of no light deflection in the object (constant thickness, constant refractive index) and with broken lines in the case of (for clarity, much exaggerated) light deflection in the object (varying thickness, varying refractive index, or both).

FIG. 1 shows in elevation an arrangement according to the invention in which the object is a plano-parallel cell (7) containing a liquid with varying absorbance and refractive index. This cell is movable in the $x$ direction by means of the device (12). The fixed slit (9) is placed close to the cell, and on its other side there is a secondary light source (3) in the form of a mat screen, illuminated by the lamp (2), the radiation of which is monochromatized by the filters (4) and (5). The angle $\alpha$ of the active light pencil can be varied by shifting the light-sensitive device (11) along the optic axis (1) by means of the device (13).

Figure 2:
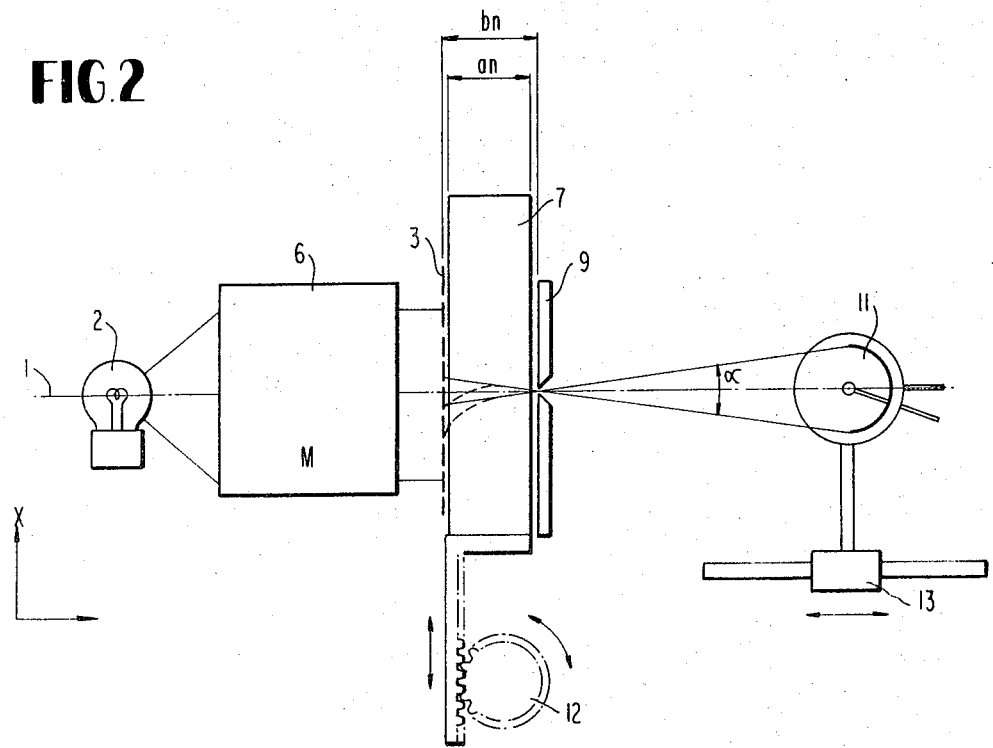

FIG. 2 differs from FIG. 1 in that there is a monochromator (6) instead of light filters, and in that the cell wall (3) facing on the monochromator is mat and serves as the secondary light source.

FIG. 3 differs from FIG. 1 in that the secondary light source (3) is omitted and in that an incandescent lamp (2) with a long, straight filament oriented in the $x$ direction is situated behind the cell rather close to it. Due to the lack of space between lamp and cell, the light filters (4) and (5) are placed between the slit (9) and the light-sensitive device (11).

FIG. 4 differs from FIG. 1 in that the cell (7) has a large cooling mantle (14) preventing a close proximity between slit (9) and cell (7). This problem is solved by having a lens (10) throwing an optical image of the slit (9) on to the middle plane of the cell (7). In addition, FIG. 4 differs from FIG. 1 in that one surface (3) of one light filter (5) is mat and serves as a secondary light source.

FIG. 5 differs from FIG. 3 in that the optic axis (1) is bent at right angle to the right of the cell by means of a 45° prism (15). In this case, the slit (9) may be engraved by metalplating on the small side of the prism (15) facing on the cell (7). With this arrangement, the relative motion between slit (9) and cell (7) can be effected by allowing the device (12) for crosswise motion to act upon the prism (15) and the light-sensitive device (11) and by having the cell (7) in a fixed position.

FIG. 6 shows in elevation an arrangement according to the invention for absorptiometric analysis of stained, horizontal gel slabs. The gel slab (8) rests upon a mat plate (3) of a material transparent to the analyzing radiation. This plate is illuminated from below by a lamp (2) much extended in the $x$ direction. Above the gel slab (8), an assembly comprising a couple of light filters (4) and (5), a slit (9), a light-sensitive device (11), and a lens (10), all mounted on a common supporting element (16), is movable along the $x$ direction, the slit (9) and the middle plane of the gel slab (8) being optically conjugate planes.

Figure 7:
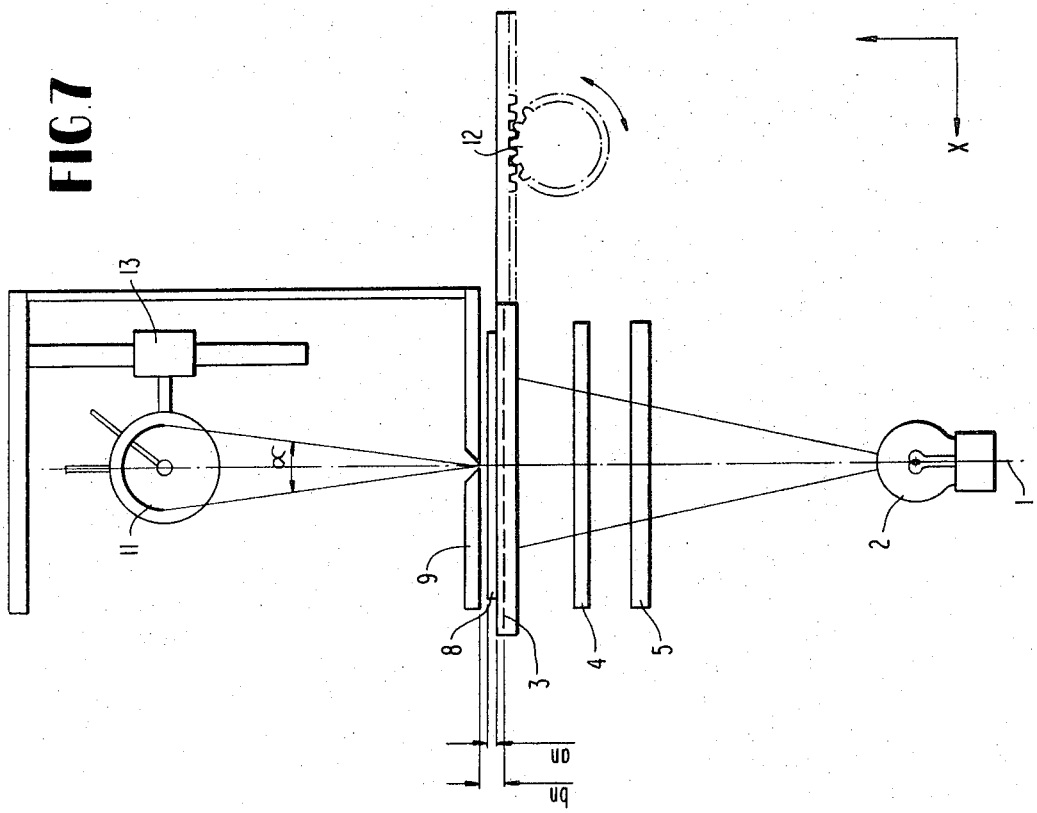
Figure 8A:
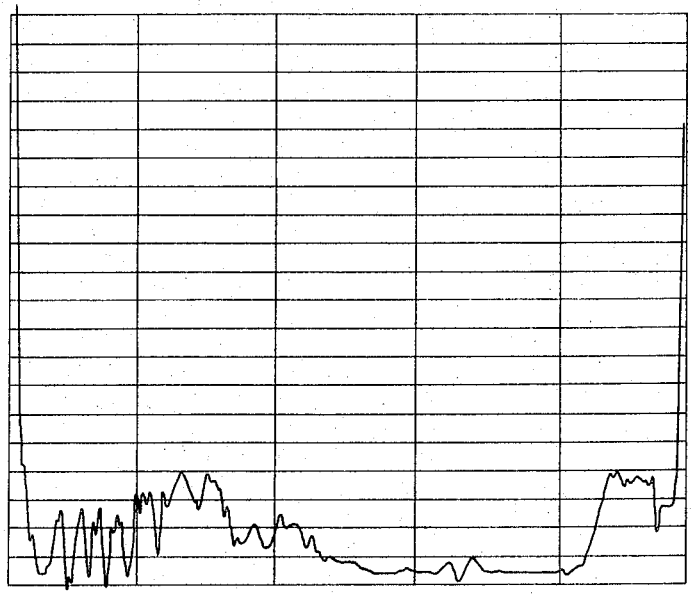
Figure 8B:
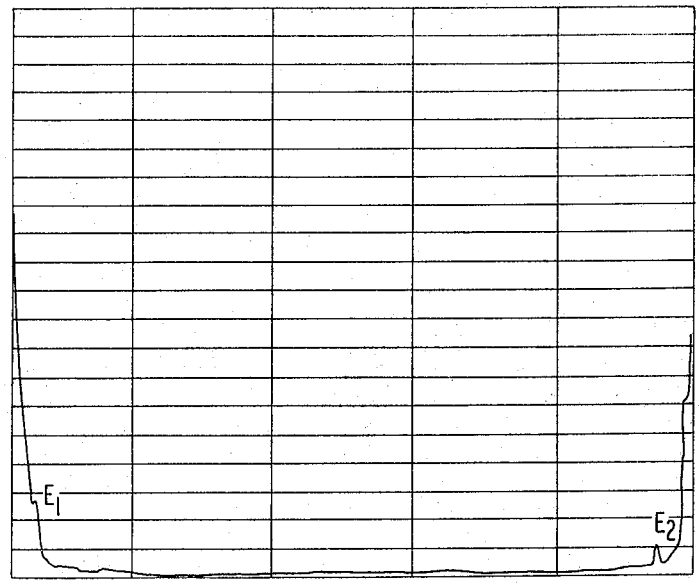

FIG. 7 differs from FIG. 6 in that the assembly containing slit (9) and light-sensitive device (11) is immovable, that the gel slab (8) with mat plate (3) is movable in the $x$ direction, that the primary light source (2) is much smaller, that the slit is placed close to the gel, and that the filters (4) and (5) are placed between the primary (2) and secondary (3) light sources.

It should be appreciated that the relative motion in the $x$ direction between the slit and the object, provided the object is a fluid, could also be achieved by allowing the fluid object to slowly flow down through a column which then comprises a holder for said object. In that case the device (12) could be dispensed with.

The proper functioning of the optical system according to the invention is demonstrated in FIG. 8, curves *a* and *b*. These records were taken after an experiment in a polished quartz cell with iso electric focusing of a batch of Ampholine (sold by LKB-Produkter AB, Bromma 1, Sweden) carrier ampholytes in a sucrose density gradient. This cell contained a strong refractive index gradient due to the downwards increasing concentration of sucrose and in addition superimposed local refractive index gradients originating from Ampholine components focused into narrow bands. Neither sucrose, nor the Ampholine components absorb light of the wavelength used during scanning, so the correct absorptiometric record should be simply a baseline without any absorption peaks. The result obtained on insertion of the cell in a spectrophotometer without a matte screen behind it is shown in FIG. 8, curve *a*. Quite a number of peaks were recorded, especially in both ends of the cell, but they must have been caused by the refractive index gradients because no absorbing material was present in the cell.

After insertion of the matte screen, curve *b* in FIG. 8 was obtained. The false absorption peaks are now absent, and the record shows the cell to be free from absorbing material.

I claim:

1. In an optical arrangement for measuring along a certain coordinate axis ($x$) the light absorbance at a certain wave length ($\lambda$) of an object in which not only the absorbance, but also the optical thickness varies along said coordinate, comprising a light source, a holder for said object, means for monochromatizing the radiation from said light source, a light-sensitive device having a specific active area for receiving from said light source radiation that has passed through said object and said monochromatizing means, a slit which is narrow in the $x$ direction and which limits the angular extension in said $x$ direction of that radiation to subtend a first angle which hits the active area of the light-sensitive device, and means for relative motion in the $x$ direction between said object and said slit, the improvement which comprises means for varying the position of the light-sensitive device with respect to said slit for exposing the entire length of said active area in the $x$ direction to said radiation during measurements of said object in the $x$ direction the light source having a constant radiation intensity in the $x$ direction over a length subtending a second angle from the slit which is always greater than a third angle subtended by the active area of the light-sensitive device from said slit, said third angle always being no greater than said first angle.

2. An arrangement according to claim 1 characterized in that the light source has a constant radiation intensity also in the direction perpendicular to the $x$ direction over a length subtending an angle from a point in the plane of the slit which is greater than the angle subtended by the active area of the light-sensitive device from said point in the plane of the slit.

3. An arrangement according to claim 1 characterized by means for varying the angle subtended by the active area of the light-sensitive device from the slit by varying the distance between said slit and said light-sensitive device.

4. An arrangement according to claim 1 characterized in that the slit is placed close to the object on the side facing on the light-sensitive device.

5. An arrangement according to claim 1 characterized in that at least one focusing optical element is added to the optical system for casting an optical image of the slit on the middle plane of the object.

6. An arrangement according to claim 1 characterized in that the means for a relative motion in the $x$ direction between object and slit is connected with the object, whereas the other optical elements are fixed.

7. An arrangement according to claim 1 characterized in that the means for a relative motion in the $x$ direction between object and slit is connected with the slit, whereas at least the object is fixed.

8. An arrangement according to claim 1 characterized in that the light source with a constant intensity over a sufficient length in the $x$ direction is a lamp with a clear bulb placed close to the object.

9. An arrangement according to claim 8 characterized in that the lamp is an incandescent lamp with a sufficiently long, straight filament oriented in the $x$ direction.

10. An arrangement according to claim 8 characterized in that the lamp is a gas-discharge lamp with a sufficiently long arc oriented in the $x$ direction.

11. An arrangement according to claim 1 characterized in that the light source with a constant intensity over a sufficient length in the $x$ direction is a secondary light source in the form of a matte surface evenly illuminated by a primary light source and reemitting light in all directions.

12. An arrangement according to claim 11 characterized in that the secondary light source is one in the $x$ direction sufficiently extended matte bulb of a lamp.

13. An arrangement according to claim 11 characterized in that the secondary light source is separate optical element in the form of a matte screen placed between the primary light source and the object.

14. An arrangement according to claim 11 chaacterized in that the secondary light source comprises a matte wall provided on the object facing the primary light source.

15. An arrangement according to claim 11 characterized in that the secondary light source is one matte surface of a light filter placed between the primary light source and the object.

* * * * *